US006973198B2

(12) United States Patent
Patton et al.

(10) Patent No.: US 6,973,198 B2
(45) Date of Patent: *Dec. 6, 2005

(54) AUTHENTIC DOCUMENT AND METHOD OF MAKING

(75) Inventors: David L. Patton, Webster, NY (US); Chris W. Honsinger, Ontario, NY (US); William C. Archie, Pittsford, NY (US); Robert C. Bryant, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 424 days.

This patent is subject to a terminal disclaimer.

(21) Appl. No.: 10/179,041

(22) Filed: Jun. 25, 2002

(65) Prior Publication Data

US 2003/0035148 A1 Feb. 20, 2003

Related U.S. Application Data

(63) Continuation-in-part of application No. 09/930,696, filed on Aug. 15, 2001.

(51) Int. Cl.$^7$ .............................................. H04K 1/00
(52) U.S. Cl. .................... 382/100; 358/3.28; 340/5.86
(58) Field of Search ................................ 382/100, 232; 358/3.28, 3.29, 3.31; 380/252, 51, 54; 713/176; 340/5.8, 5.86; 283/72, 74, 79, 85, 901

(56) References Cited

U.S. PATENT DOCUMENTS

| | | | |
|---|---|---|---|
| 4,218,674 A | * 8/1980 | Brosow et al. ......... 340/149 A |
| 4,661,983 A | * 4/1987 | Knop ............................... 382/1 |
| 5,243,173 A | 9/1993 | Dunn ........................... 235/375 |
| 5,325,167 A | * 6/1994 | Melen .......................... 356/71 |
| 5,354,097 A | * 10/1994 | Tel ................................ 283/72 |
| 5,521,984 A | * 5/1996 | Denenberg et al. .......... 382/209 |
| 5,974,150 A | * 10/1999 | Kaish et al. ................... 380/25 |
| 6,044,156 A | 3/2000 | Honsinger et al. ............. 380/54 |
| 6,243,480 B1 | * 6/2001 | Zhao et al. .................. 382/100 |
| 2001/0037455 A1 | * 11/2001 | Lawandy et al. ........... 713/176 |

FOREIGN PATENT DOCUMENTS

| EP | 0 676 877 A2 | 10/1995 | ............. H04L 9/32 |
|---|---|---|---|
| EP | 1 039 420 A2 | 9/2000 | ............. G07F 7/08 |
| EP | 1 094 660 A2 | 4/2001 | ............. H04N 1/32 |
| FR | 2765014 A1 | 12/1998 | ............. G07D 7/00 |
| FR | 2800896 A1 | 5/2001 | ............. G07D 7/00 |

OTHER PUBLICATIONS van Renesse, "3DAS: A 3Dimensional-Structure Authentication System," *Proc. European Convention on Security and Detection*, May 1995, pp. 45-49.*
English translation of FR 2 765 014 A1.*
English translation of FR 2 800 896 A1.*
Article from Hardcopy Observer; Pitney Postage Plan Wins Approval, Escher Tries New Approach.

* cited by examiner

*Primary Examiner*—Andrew W. Johns
(74) *Attorney, Agent, or Firm*—Frank Pincelli

(57) ABSTRACT

A media that is used for making an authenticable original document and a method for making the document. The media has an area on which a custom three dimensional physical indicia identifier can be formed thereon by a user. The area of the media is made of a material such that when the three dimensional physical indicia is digitally scanned a unique digital file is produced.

4 Claims, 14 Drawing Sheets

AUTHENTIC DOCUMENT AND METHOD OF MAKING

CROSS REFERENCE TO RELATED APPLICATIONS

This is a Continuation-In-Part application of U.S. Ser. No. 09/930,696; filed Aug. 15, 2001; of David L. Patton, Chris W. Honsinger, and Robert C. Bryant, entitled "Authentic Document And Method Of Making".

FIELD OF THE INVENTION

The invention relates generally to the field of authenticating documents and in particular creating a print medium with an identifying physical anomaly.

BACKGROUND OF THE INVENTION

An article from the Hardcopy Observer, "Pitney Postage Plan Wins Approval, Escher Tries New Approach", January 2000 announces a technology that enhances the security of postage documents by forming a signature of the paper fiber over a localized region and then printing this signature elsewhere on the envelope in the form of wavy lines.

Since the image obtained from scanning paper fiber is random, it is very likely that no two envelopes ever have or ever will possess the same fiber structure. Therefore, every envelope may be considered to have a unique identifier and may be used to uniquely identify every letter. The technique requires that the fiber signature be printed and encoded as a series of wavy lines elsewhere on the envelope. How the fiber signature is distilled from the fibrous region is not disclosed. A significant advantage of this system is that it is unlikely that a counterfeiter would discover the process needed to duplicate this process. Simply copying the envelope is not sufficient because modem copiers do not copy the fibrous structure. The copier resolution is simply not high enough. By providing an information channel directly related to the unique aspects of the paper itself, the ability to counterfeit is minimized.

However, the technique described above has a significant shortcoming. The requirement is that the fibrous signature is used as the unique identifier. The fibrous signature relies on the construction of the paper base of the envelope. Other medium such as photographic paper, thermal transfer, and inkjet all have different surface characteristics. In some cases these media do not have a paper base or a paper base that is close to the surface where the fiber structure is available for scanning. These media generally have a receiver layer constructed using a polymeric material. The polymeric materials used to form the receiving layer cover the paper base obscuring the fibers. The fibers themselves are susceptible to damage from outside elements such as water, abrasion, etc. In addition the technique does not provide a separate record in the form of a digital file of the scan of the envelope's fiber or link that file back to the envelope.

Verification Technologies, Inc. discloses on their Website at www.netventure.com/vti/isis/main.htm a method for identifying valuable objects by capturing a unique series of microphotographs and a log of how they are collected. The microphotographs are then used to verify the authenticity of the objects.

In each of the cases cited the feature being scanned or photographed already exists as a part of the object. The features are not purposely created during the time of manufacture for the sole purpose of proving authenticity. Nor is any attempt made to artificially create the mark or produce a mark that is physically robust.

It is an object of the present invention to provide a high-resolution scan of the physical indicia identifier creating a unique digital representation of the physical indicia identifier.

It is a further object of the present invention to provide a cryptographically secure method for invisibly hiding (or embedding) a message derived using a texturally derived signature from the anomaly. In the case of printed image on the media, the need for a visible representation of the data to authenticate an image is eliminated.

It is another object of the present invention to provide a unique physical indicia identifier by embossing, etching or printing a pattern on the front or back surface of a media.

It is a further object of the present invention to provide a high-resolution scan of the physical indicia identifier creating a unique digital representation of the physical indicia identifier.

In the case where the unique physical indicia identifier is preformed on a sheet of media, the disadvantage is that the unique physical indicia identifier must be linked to its high resolution scan via a number preprinted on the media and stored on or in memory at the time of manufacture. When used to produce an original document, the user must make sure the link between unique physical indicia identifier, its stored high resolution scan and the media to be printed, is correctly made.

It is still a further object of the present invention to provide the user with the ability to form a unique physical indicia identifier at the time the original document is to be produced.

SUMMARY OF THE INVENTION

In accordance with one aspect of the present invention there is provided a method for making an authenticable original document on a sheet of media, the sheet of media having a material thereon on which a physical indicia identifier can be formed by the user and an identification number printed thereon, comprising the steps of:

obtaining a high resolution scan of the physical indicia identifier and creating a digital file of the high resolution scan;

associating the high resolution scan file to the identification number printed on the sheet of media;

storing the high resolution scan file in memory;

creating a digital text file to be printed on the sheet;

distilling said digital text file;

creating a message image using the distilled text file;

combining the message image with the high-resolution scan file of physical indicia identifier so as to create a dispersed message; and printing the dispersed message along with the text file on the sheet.

In another aspect of the present invention there is provided a kit for making an authenticable original document comprising:

at least one sheet of media having an area on which a physical indicia identifier can be formed thereon and an identification number printed on the sheet of media;

a memory storage device creates a digital file of a high resolution scan of the physical indicia identifier placed thereon, the physical indicia identifier being associated with the identification number.

In accordance with yet another aspect of the present invention there is provided a system for verifying that a candidate document is an original document, comprising:

a scanner for scanning the candidate document for obtaining a high resolution scan of a custom physical indicia identifier formed on the document, the document having a identification number associated with a stored high resolution scan of the custom physical indicia identifier;

a computer for accessing the stored high resolution scan using the identification number and for comparing the high resolution scan obtained by scanning with the stored high resolution scan for verification that the candidate document is the original document.

In accordance with still another aspect of the present invention there is provided a method for making media on which is used for making an authenticable original document, comprising the steps of:

providing a predetermined amount of media;

the media having an area on which a custom physical identifier can be formed by a user;

forming a three dimensional physical indicia identifier on the predetermined amount of media.

In accordance with yet still another aspect of the present invention there is provided a media that is used for making an authenticable original document, the media having an area on which a custom three dimensional physical indicia identifier can be formed thereon by a user, the area of the media having a material such that when the three dimensional physical indicia is digitally scanned a unique digital file is produced.

These and other aspects, objects, features, and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings in which:

FIG. 11b is a section view the web of media made in accordance with the present invention as taken along line 11b—11b of FIG. 11a;

FIG. 12b is a schematic diagram of a top view of a sheet of media made in accordance with the present invention of FIG. 12a;

DETAILED DESCRIPTION OF THE INVENTION

The invention utilizes aspects of data embedding. The science of data embedding is also referred to as data hiding, information hiding, data embedding, watermarking, and steganography. A data embedding technique is disclosed in Honsinger, et al., U.S. Pat. No. 6,044,156, which is incorporated herein by reference.

Figure 1:
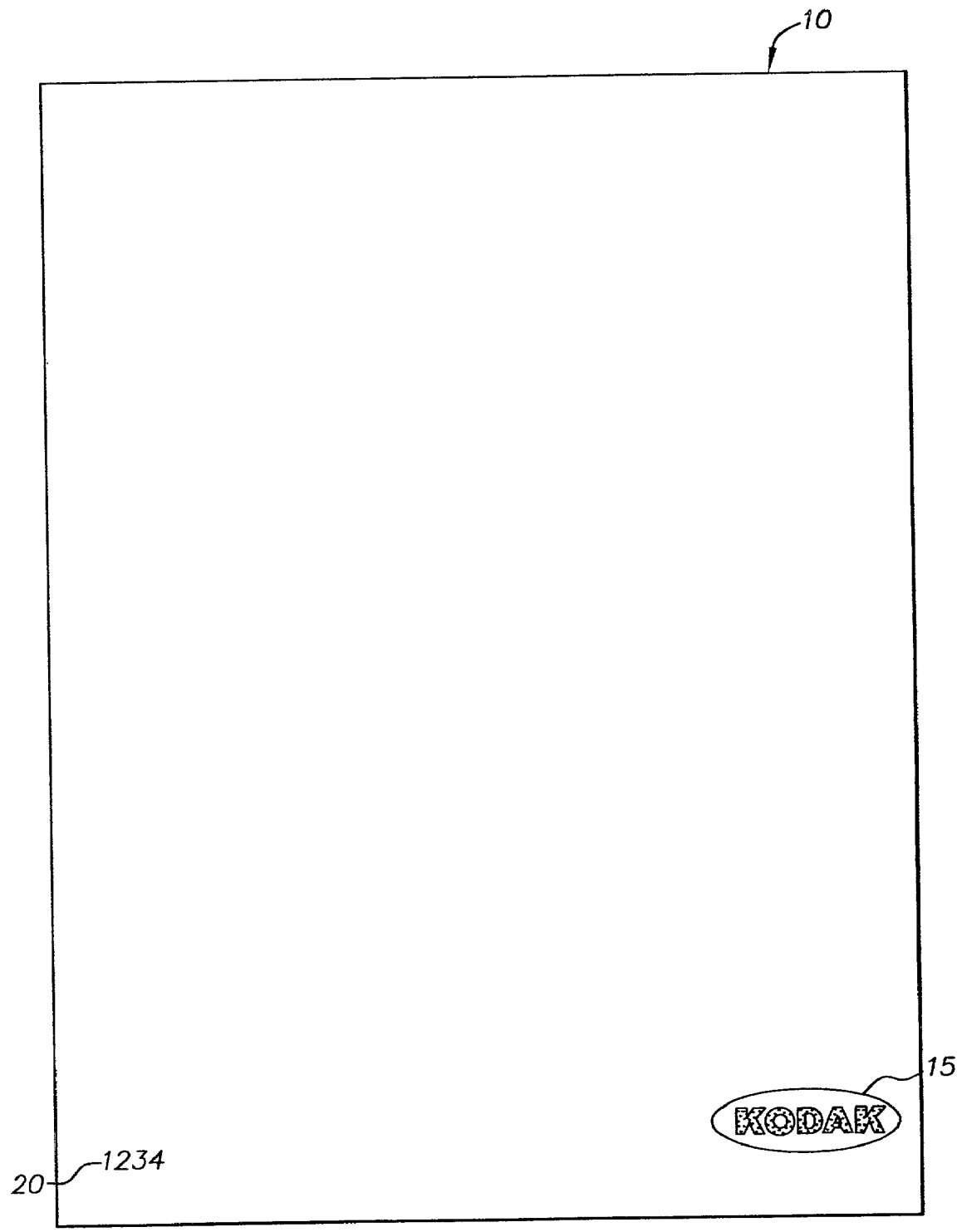
FIG. 1 is a schematic of a sheet of media having preformed physical indicia identifier made in accordance with the present invention.

Referring to FIG. 1, there is illustrated a sheet 10 for making a document in accordance with the present invention. Sheet 10 may be a print medium such as photosensitive, ink-jet, or thermal transfer media uniquely fingerprinted with a physical indicia identifier 15. The physical indicia identifier 15 is a unique physical feature formed in the front or back surface or an integral part of the structure of the sheet 10. For example, the physical indicia identifier 15 can be but is not limited to an embossed, etched or engraved indicia or a discernable physical characteristic on the front and/or back surface of the sheet 10 and not duplicatable using known visual copying techniques. The physical indicia identifier 15 may or may not be visible to the unaided eye. Sheet 10 is also printed with a unique identification number 20. The identification number 20 may be a human and/or machine-readable code, for example an alphanumeric or a bar code.

Figure 2:
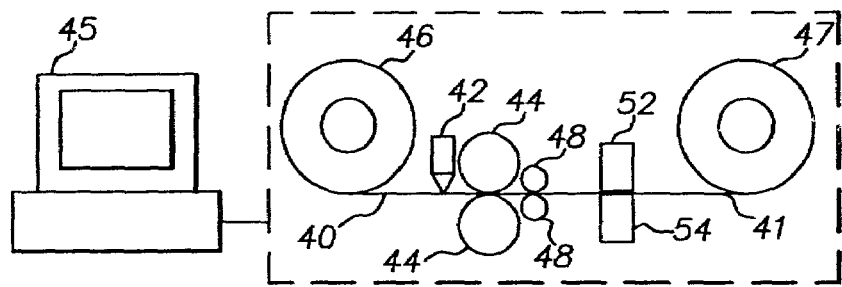
FIG. 2 is a schematic diagram illustrating how a sheet of media having pre-formed physical indicia identifier is made in accordance with the present invention.

Referring now to FIG. 2, there is illustrated a schematic diagram of an apparatus for making the sheet 10 of media 41 having the physical indicia identifier 15 and identification number 20. It is well known to those in the art of manufacturing resin-coated media that a resin such as polyurethane or polyethylene is heated to above the glass transition point then applied to a base 40 such as paper or plastic via a hopper 42. After the resin has been applied to the base, the base is run through a set of chilled rollers 44 where the resin is evenly spread over the surface of the base 40 and hardened. The resulting base 40 can be used to manufacture media 41 in the form of thermal, photosensitive paper or inkjet paper. The type of media 41 being manufactured can determine whether the physical indicia identifier 15 is formed on the front or back surface. For example if the media 41 is of the thermal type having a resin overcoat, the physical indicia identifier 15 may be formed on the top surface. If the media 41 is photosensitive paper where an emulsion is coated on a resin coated base, the physical indicia identifier 15 may be formed on the back surface. If the media 41 is inkjet paper, which may or may not have a resin coating, the embossing may be used to form the physical indicia identifier 15 on either the back or front surface. In the case where the media 41 is manufactured in a roll 46 to roll 47 process as shown in FIG. 2, the base 40, after the resin has been coated, passes through a set of physical indicia identifier forming rollers 48. Referring to FIG. 4, there is illustrated an enlarged partial view of FIGS. 2 and 3. The rollers 48 contain heating elements 50 similar to the heating elements used in thermal heat heads such as those used in a KODAK ds 8650 PS Color Printer. As the media 41 passes between the rollers' heating elements 50 the heat from the heating elements 50 form a specified three-dimensional pattern of the physical indicia identifier 15. A logic control unit, such as computer 45 controls the heating elements to provide successively different physical indicias. This allows the forming of a unique physical indicia identifier 15 for each sheet. After the physical indicia identifier 15 is formed in the surface of the resin coating a high-resolution scan is made via a scanner 52 and/or 54. In addition, an identification number 20 is printed on either the front or back surface of the media 41 via a printer 56 or a printer 58 located on the roller 48 and/or roller 49 respectively. In the embodiment illustrated, the high resolution-scan is on the order of 1200 dots/inch. The results of the high resolution-scan are stored in memory, for example in memory of computer 45 or on a memory storage device such as on a CD 25 (shown in FIG. 6) via a computer 45 along with the identification number 20. The method used for obtaining the high-resolution scan will be explained later. While in the particular embodiment illustrated the results of the scan is stored on a CD, it may be stored in any desired memory storage device or location. For example, but not limited to a computer disc, memory stick, memory card, or an Internet accessible URL address such as a web site.

Figure 3:
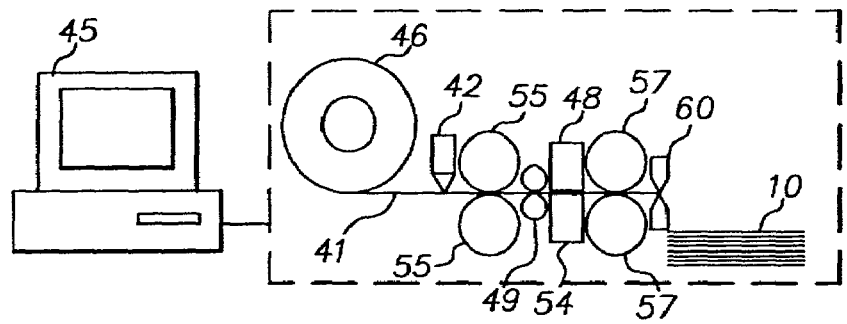
FIG. 3 is a schematic diagram illustrating a second embodiment of how a sheet of media having pre-formed physical indicia identifier is made in accordance with the present invention.
Figure 4:
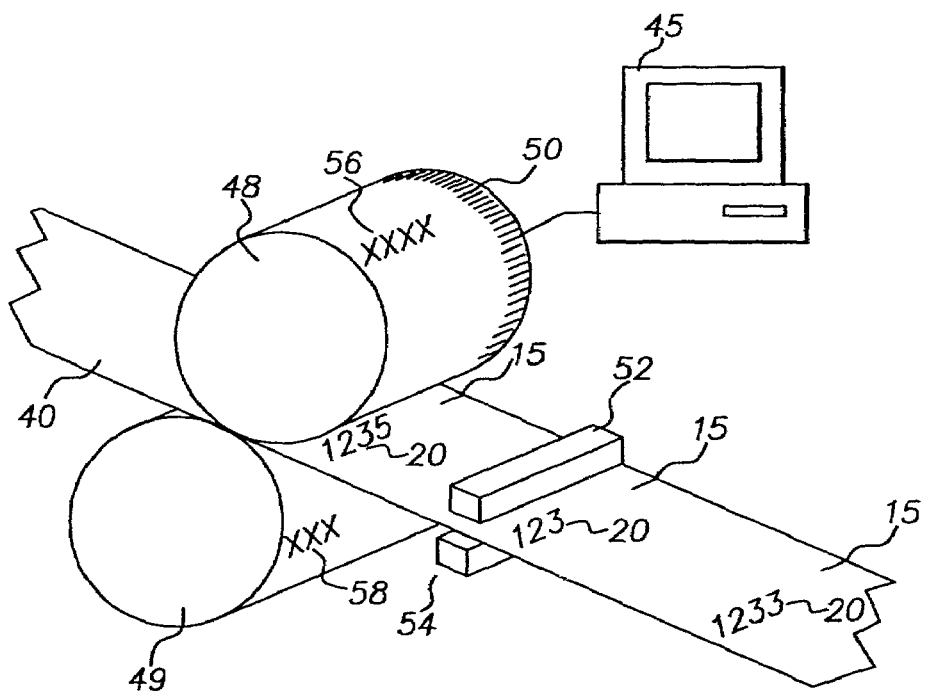
FIG. 4 is a partial view of FIGS. 2 and 3 illustrating how a sheet of media having pre-formed physical indicia identifier is made in accordance with the present invention.

FIG. 3 illustrates a schematic diagram of an apparatus made in accordance with the present invention wherein the media 41 is cut into a plurality of cut sheets 43 each having a physical indicia identifier 15 and identification number 20 as previously discussed. Like numerals in FIG. 3 indicate like parts and operation as previously discussed with respect to FIG. 2. The media 41 is fed from the roll 46 via a set of drive rollers 55 and 57 through the set of rollers 48 and 49. These rollers 48 and 49 contain either heating elements 50 or embossers (not shown). As the media 41 passes between the roller 48 and 49 the embossing roller form the specified pattern of the physical indicia identifier 15. As each unique physical indicia identifier 15 is formed in the surface of the media 41 the high-resolution scan is made via the scanner 52 or 54 and the identification number 20 is printed on either the front or back surface of the media 41 via printer 56 or a printer 58. After the physical indicia identifier 15 has been formed and the identification number 20 printed on the media 41, the media 41 is cut into sheets 10 via a cutter assembly 60. Each sheet 10 having its' own distinct physical indicia identifier 15, identification number 20, which is associated with a unique scan of the identifier 15. Typically this is accomplished by a computer associating the scanned digital file with the identification number 20 and storing this information in a memory device.

Figure 5:
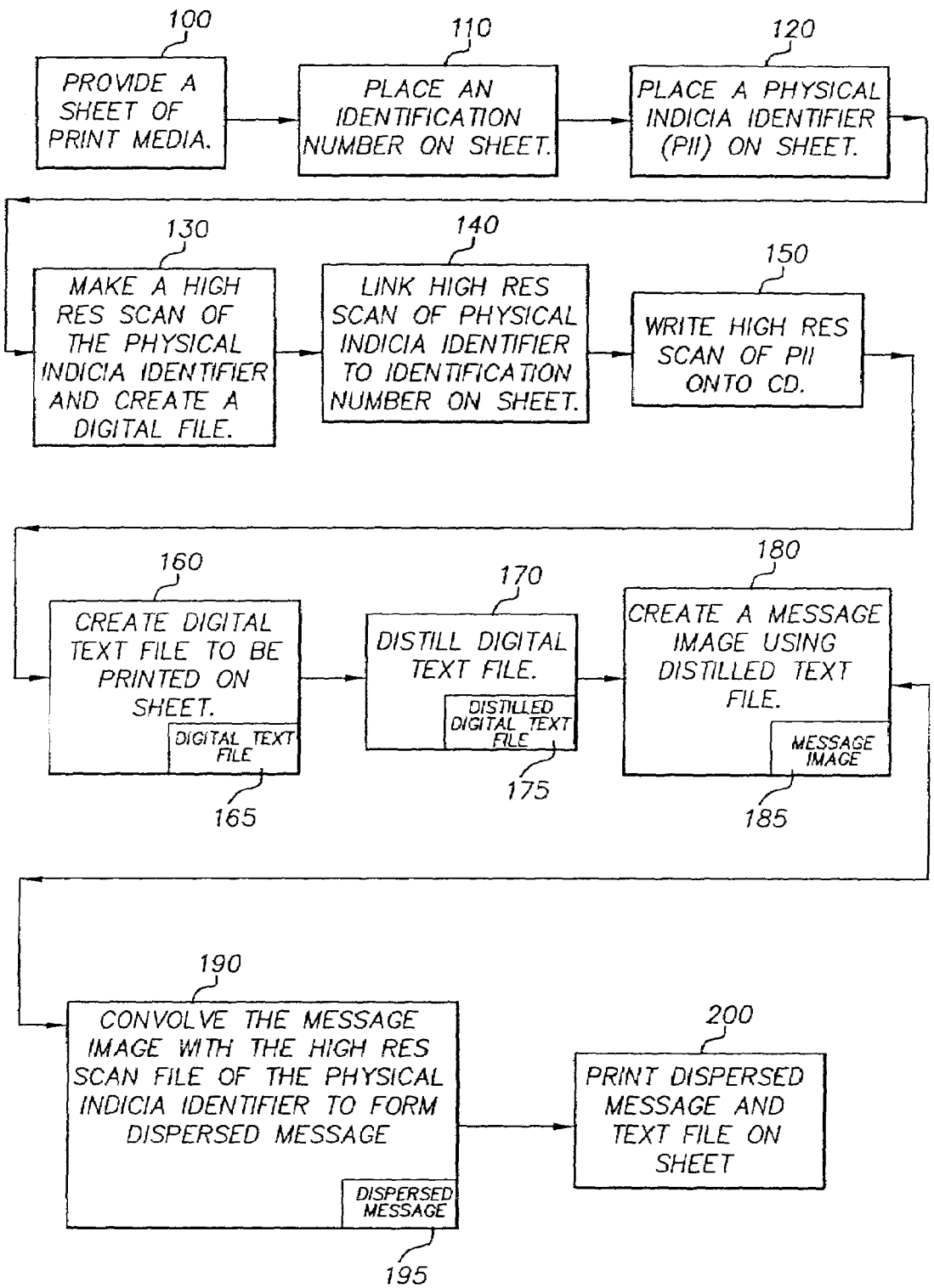
FIG. 5 is a flow chart illustrating the operation of the overall system made in accordance with the present invention.

Referring to FIG. 5, a flow chart illustrates a method for making an original document using sheet 10 in accordance with the present invention. A sheet 10 is provided at step 100. The identification number 20 is printed on sheet 10 and the physical indicia identifier 15 is formed on the sheet 10 at steps 110 and 120 respectively. A high-resolution scan of the physical indicia identifier 15 is made and a digital file of the high-resolution scan is created at step 130. The digital file of the high-resolution scan is linked to the sheet 10 via the printed identification number 20 at step 140. The high-resolution scan provides a unique digital file with respect to physical indicia identifier 15. The digital file of the high-resolution scan of the physical indicia identifier 15 is stored in memory such as written to a CD 25 (shown in FIG. 6) at step 150 and is associated with the unique identifier number 20. A digital file that is to be later printed on the sheet 10 is created at step 160. In the particular embodiment illustrated, the digital file is a text file 165, however, the digital file may be an image file or mixture of text and image files. For the purposes of the present invention a text file shall mean a text file, an image file, or a combination of text and image files. If the text file 165 is large, it may be distilled at step 170 to a smaller representation called a distilled digital text file 175 using hash algorithms. These algorithms are utilized widely in computer systems. An example of a known hash algorithm is the Secure Hash Algorithm (SHA) of National Institute of Standards and Technology (NIST). With this algorithm it is possible to distill a large data set to 160 bits, rendering the probability of any two documents having the same hash value astronomically small. Modem watermarking technologies can easily hide this amount of data.

Using the distilled digital text file 175 and an algorithm on CD 25 a message image 185 is created at step 180. Briefly, the message image 185 is obtained taking the distilled image and scrambling it into a predetermined pattern/template. An example of obtaining this message image is described in greater detail in U.S. patent Ser. No. 09/613,989, entitled "Authenticable Image With An Embedded Image Having A Discernible Physical Characteristic" filed on Jul. 11, 2000 by Chris W. Honsinger, and U.S. Pat. No. 6,044,156 both of which are incorporated herein by reference. The message image 185 is combined with the high-resolution scan file of the physical indicia identifier 15 at step 190. One method of combining is convolving. An example of convolving is described in co-pending U.S. patent application Ser. No. 09/930,634, filed on Aug. 15, 2001 entitled "Self Authenticating Media Using A Public Fiber Carrier And An Auxiliary Private Carrier" and filed in the name of Chris W. Honsinger and David L. Patton, which is hereby incorporated by reference. From the Fourier theory, spatial convolution of two functions in the frequency domain is the same as adding together the functions phases while multiplying their respective Fourier amplitudes. Therefore, the effects of combining the message with a carrier, such as by the described convolution technique, distributes the message energy in accordance with the phase of the carrier and to modulate the amplitude spectrum of the message with the amplitude spectrum of the carrier. If the message image were a single delta function and the carrier of random phase and of uniform Fourier magnitude, the effect of convolving with the carrier would be to distribute the delta function over space. The Fourier magnitude would maintain its shape because the carrier is of uniform amplitude spectrum. If the amplitude of the convolved delta function is lowered in the space domain, the convolution may be viewed as a way to redistribute energy over space in an invisible way. The effect of convolving an arbitrary message with a random phase carrier is to spatially disperse the message energy over the image. In this sense, the convolution is a dispersive process. The message image 185 combined or convolved with the high resolution scan file of the physical indicia identifier 15 creates a dispersed message 195 at step 190 and the dispersed message 195 along with the text 36 is printed on the sheet 10 at step 200. Due to the convolution step only the text 36 will be seen and the dispersed message 195 will not be seen by the unaided eye.

Figure 6:
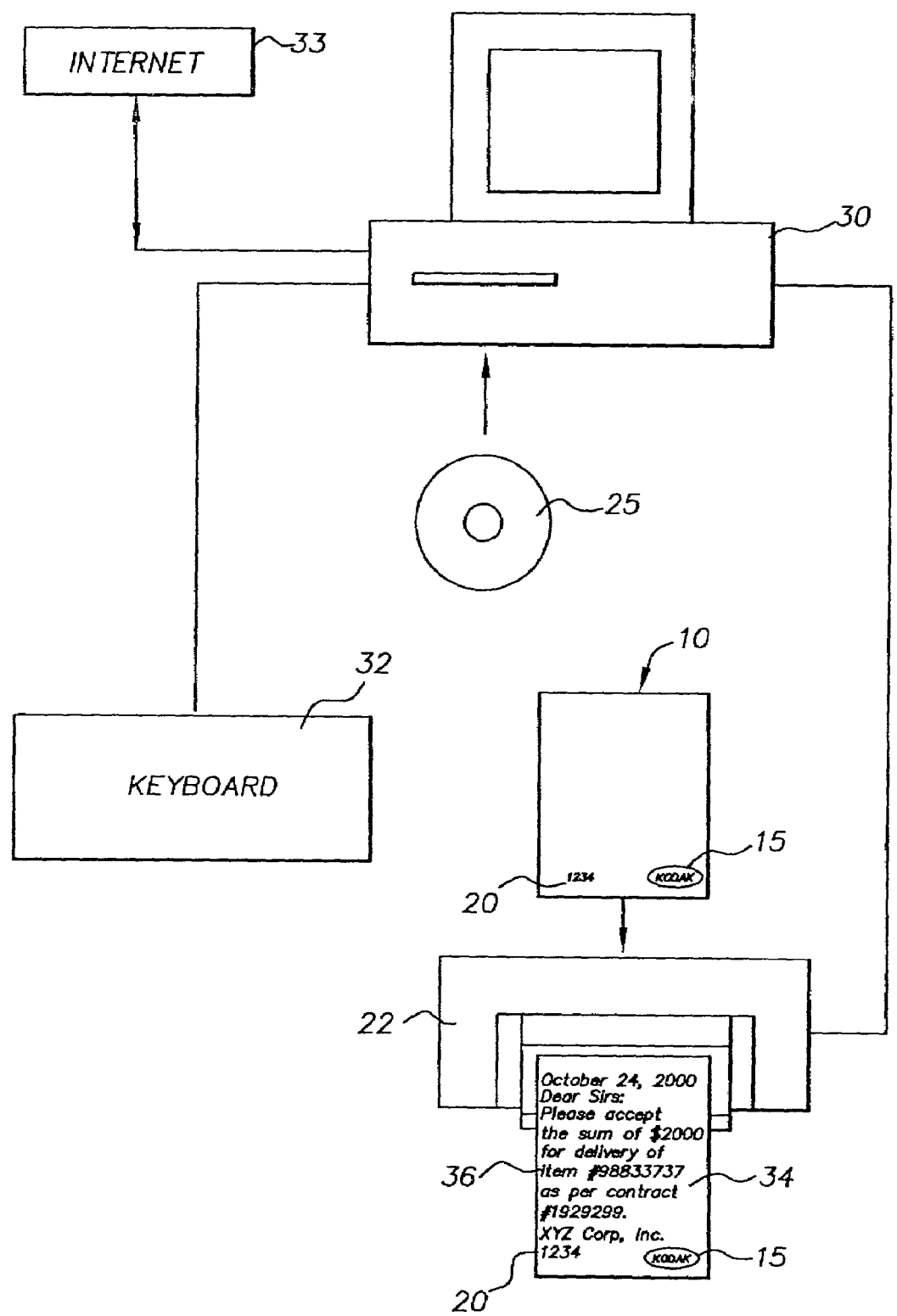
FIG. 6 is a schematic diagram of a system made in accordance with the present invention.

Referring now to FIG. 6, the sheet 10 containing the physical indicia identifier 15 and identification number 20 is placed into a printer 22 such as an inkjet or thermal printer. A compact disc (CD) 25 containing the digital file of the high-resolution scan of the physical indicia identifier 15 is placed into a computer 30. The digital file of the high-resolution scan of the physical indicia identifier 15 has previously been associated to the sheet 10 via the identification number 20. The high-resolution scan of the physical indicia identifier 15 can also exist on a remote server located at a service provider and be accessed via a communication network such as the Internet 33. The high-resolution scan of the physical indicia identifier 15 can also exist in any type of memory such as a floppy disk, DVD, hard drive, portal hard drive, etc. and delivered to the computer 30 by any appropriate means.

Figure 7:
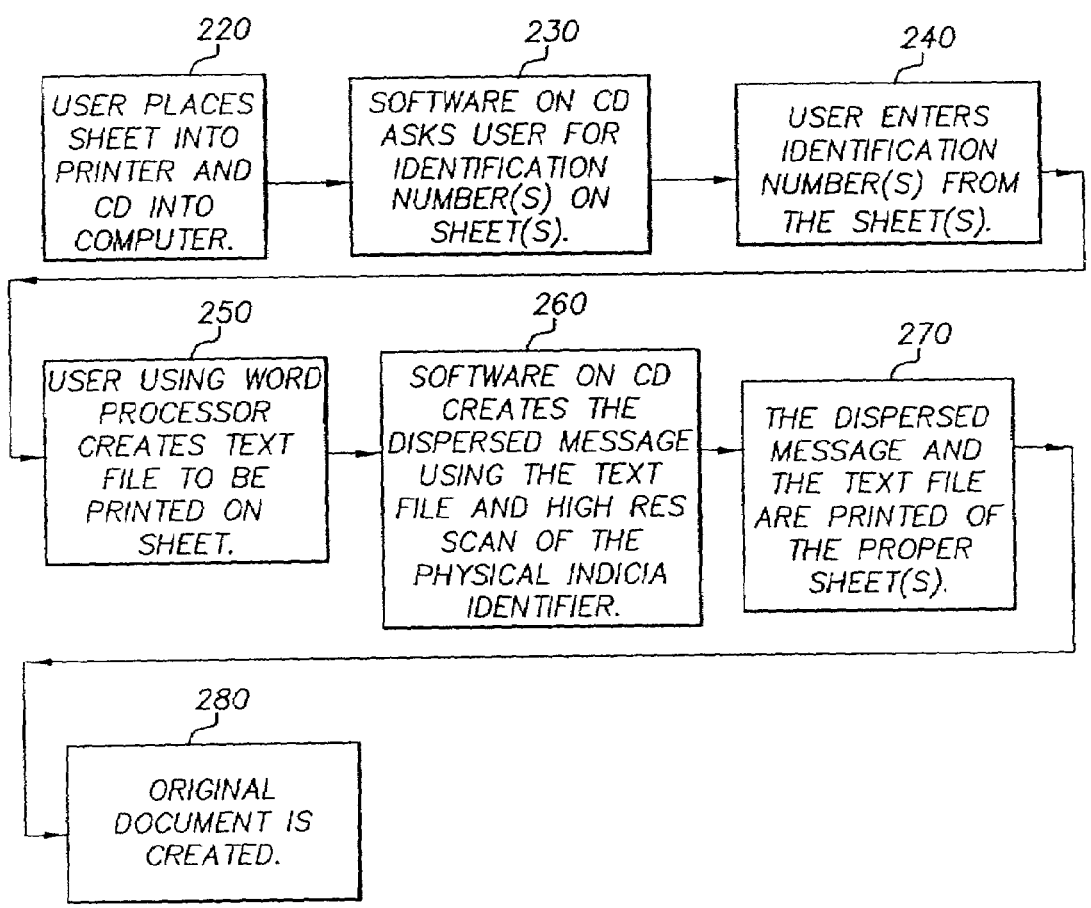
FIG. 7 is a flow chart of the operation of the system of FIG. 6.
Figure 8:
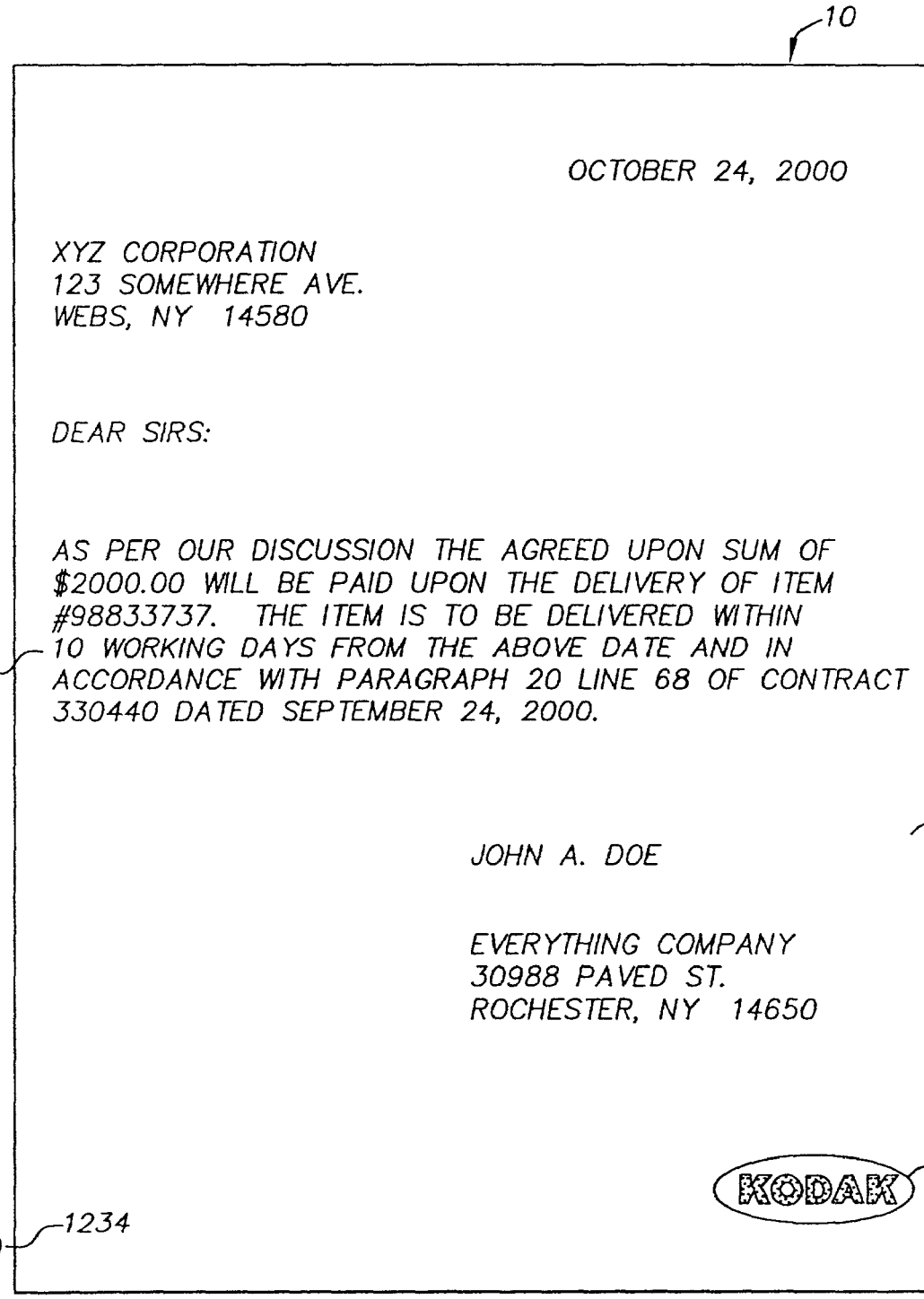
FIG. 8 is a completed document made using the sheet of FIG. 1.

Now referring to FIG. 7, there is illustrated a flow chart showing how a user creates an original document 34 shown in FIGS. 6 and 8 made in accordance with the present invention. The user places the sheet 10 into the printer 22 and the CD 25 into the computer 30 at step 220. A software program in the computer 30, typically obtained from the CD 25, asks the user for the identification number(s) 20 for the sheet(s) 10 at step 230. The user enters the identification number 20 via a keyboard 32 (shown in FIG. 6) at step 240. If there is more than one sheet required for printing the document, the correct identification number 20 for each sheet placed into the printer and the additional sheets are entered into the computer in the order they will be printed. Using a word processor such as Microsoft Word or Claris Works, the user creates the text file, which is to be printed on the sheet 10 at step 250. The software using the physical indicia identifier high-resolution scan file 15 and the digital text file creates the dispersed message at step 260 which was previously described in greater detail with respect to steps 160, 170, 180 & 190 of FIG. 5. The digital text file 165 with the dispersed message 195 intermixed therein is printed on the selected sheet(s) at step 270 creating only one original document 34 at step 280 as shown in FIGS. 6 and 8 that cannot be counterfeited using standard duplicating methods.

Now referring to FIG. 8, there is illustrated the completed document 34 made in accordance with the present invention. The completed document 34 comprises the physical indicia identifier 15, the identification number 20, the text 36, and the dispersed message 195, which is not normally visible as it is intermixed with the text 36.

Figure 9A:
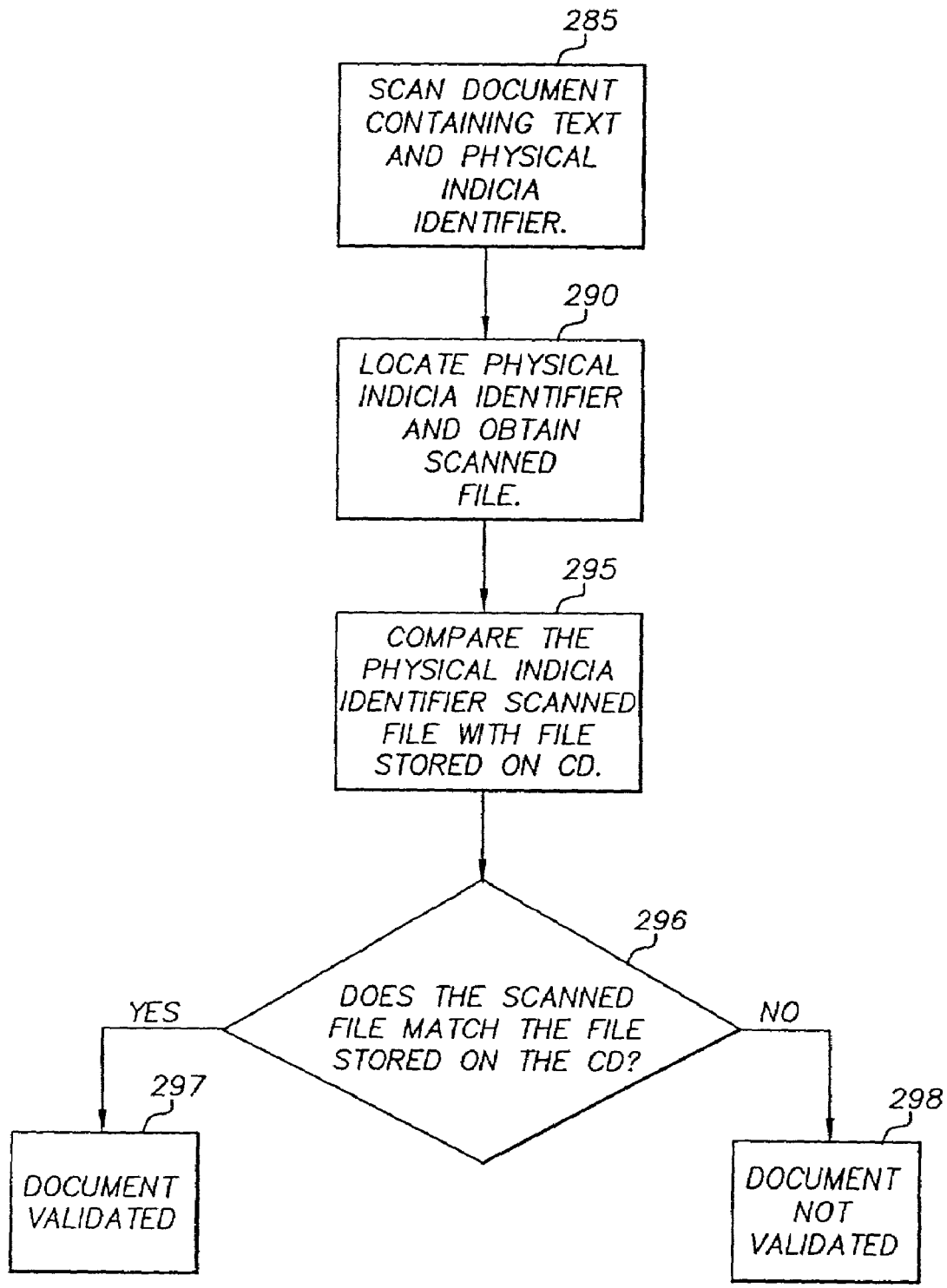
FIG. 9A is a flow chart illustrating one method on how the document of FIG. 8 is verified.

Now referring to FIG. 9A, there is illustrated a flow chart of one method on how a document is verified in accordance with the present invention. A digital scan of the physical indicia identifier 15 is made at step 285. The identification number is used to find the previously scanned information of the physical indicia identifier 15 on CD 25 at step 290. This stored information is compared with the information obtained by scanning of the physical indicia identifier 15 on document at step 295. If the scanned information regarding the physical indicia identifier 15 is the same as the stored information the document is verified at decision block 296 as being an original at step 297, otherwise the scanned document cannot be verified at step 298.

Figure 9B:
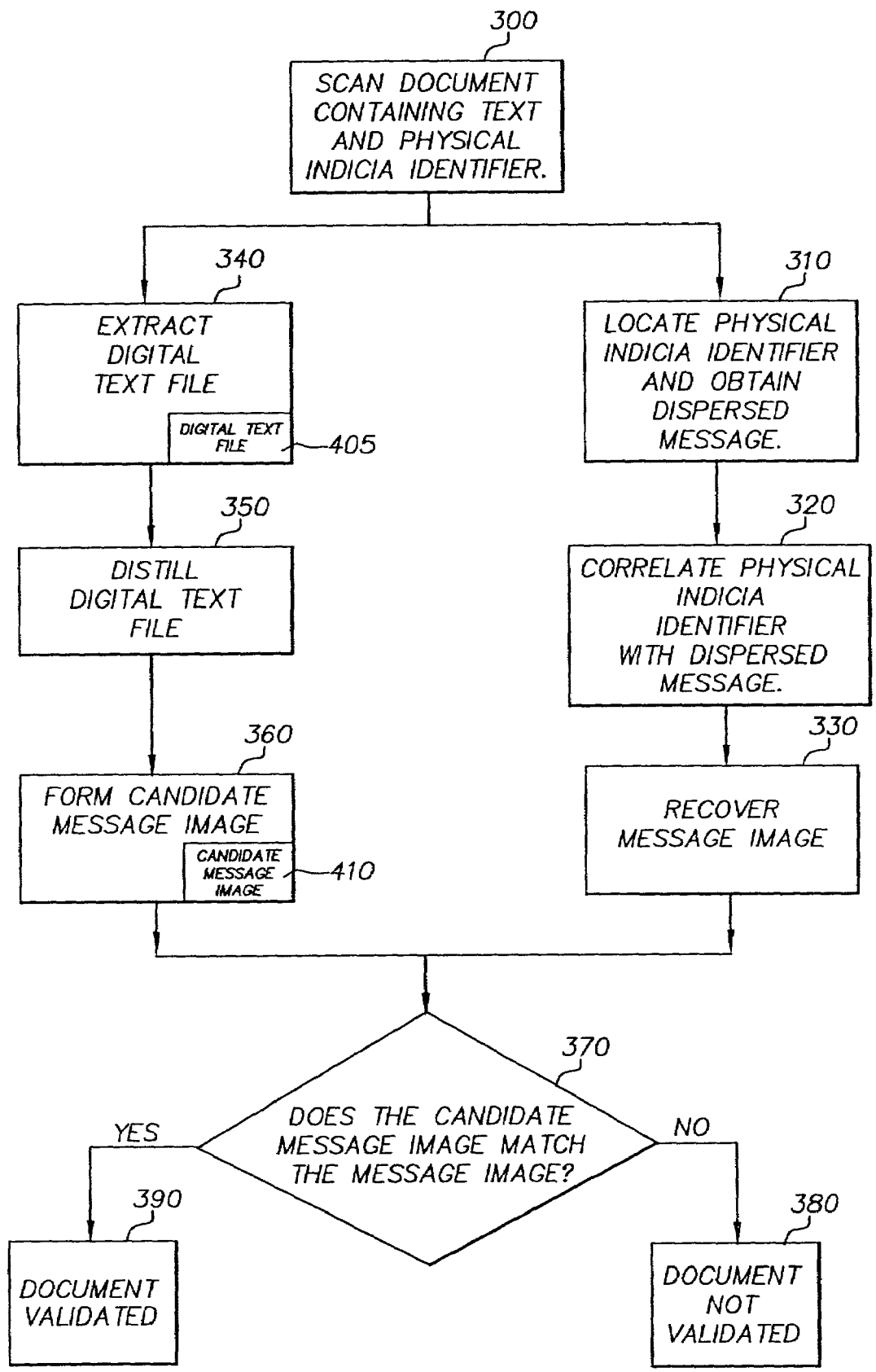
FIG. 9B is a flow chart illustrating another method on how the document of FIG. 8 is verified.

Referring to FIG. 9B there is illustrated a flow chart of another method on how a document is verified in accordance with the present invention. In this method two different techniques are used to derive the same common data such that the common data obtained by the two different techniques must correspond in order to verify that the document is an original. A digital scan of the document 34 is made at step 300 and using appropriate algorithms on CD 25, the physical indicia identifier 15, the text 36, and the dispersed message 195 are obtained. The physical indicia identifier 15 is located and the dispersed message 195 is obtained at step 310. By using the data embedding and extraction algorithm described in detail below, the physical indicia identifier 15 is processed in the Fourier domain to maintain phase and flatten the Fourier magnitude. This result is inverse Fourier transformed to obtain a carrier, which is then correlated with the dispersed message 195 as found by step 190 previously discussed in FIG. 5. The physical indicia identifier 15 is correlated with the dispersed message 195, and the message image 185 is recovered at step 330. Now, the message image 185 recovered at step 330 should correspond to the candidate message image 410 (text file) that is to be validated.

To obtain the candidate message image 410, the text file 405 is extracted at step 340 from the scan done at step 300. An optical character-recognition (OCR) algorithm extracts the digital file 405 of the text at step 340. It is understood that OCR is one example of a text recognition algorithm and there are many others that can be used. Using the same hash algorithm, text file 405 is distilled at step 350. This distilled text is used to create a message image as discussed with respect to FIG. 5 to form a candidate message image 410 at step 360. A decision of validity is made at decision block 370 by comparing the value of the candidate message image 410 obtained at step 360 with the message image 185 recovered at step 330. If the candidate message image 410 is the same as the recovered message image 185 recovered at step 330, the document is validated at step 390. Otherwise the document is not validated at step 380. As can be seen in this method two distinct techniques are used to obtain a common data. In one method the common data is obtained starting from the beginning of the method of FIG. 5. In the second method using the scanned document and starting at the end of method of FIG. 5 and working backwards, the common data is obtained. In the embodiment illustrated the common data is the message image, however, the common data could have been the distilled text file. In such case after step 330, the distilled text file could have been obtained using the appropriate algorithm. This could have been compared with the data obtained at step 350. All that is important is that the common data is obtained using one method starting from the beginning and compared with the common data is starting from the other end of the process.

Figure 10A:
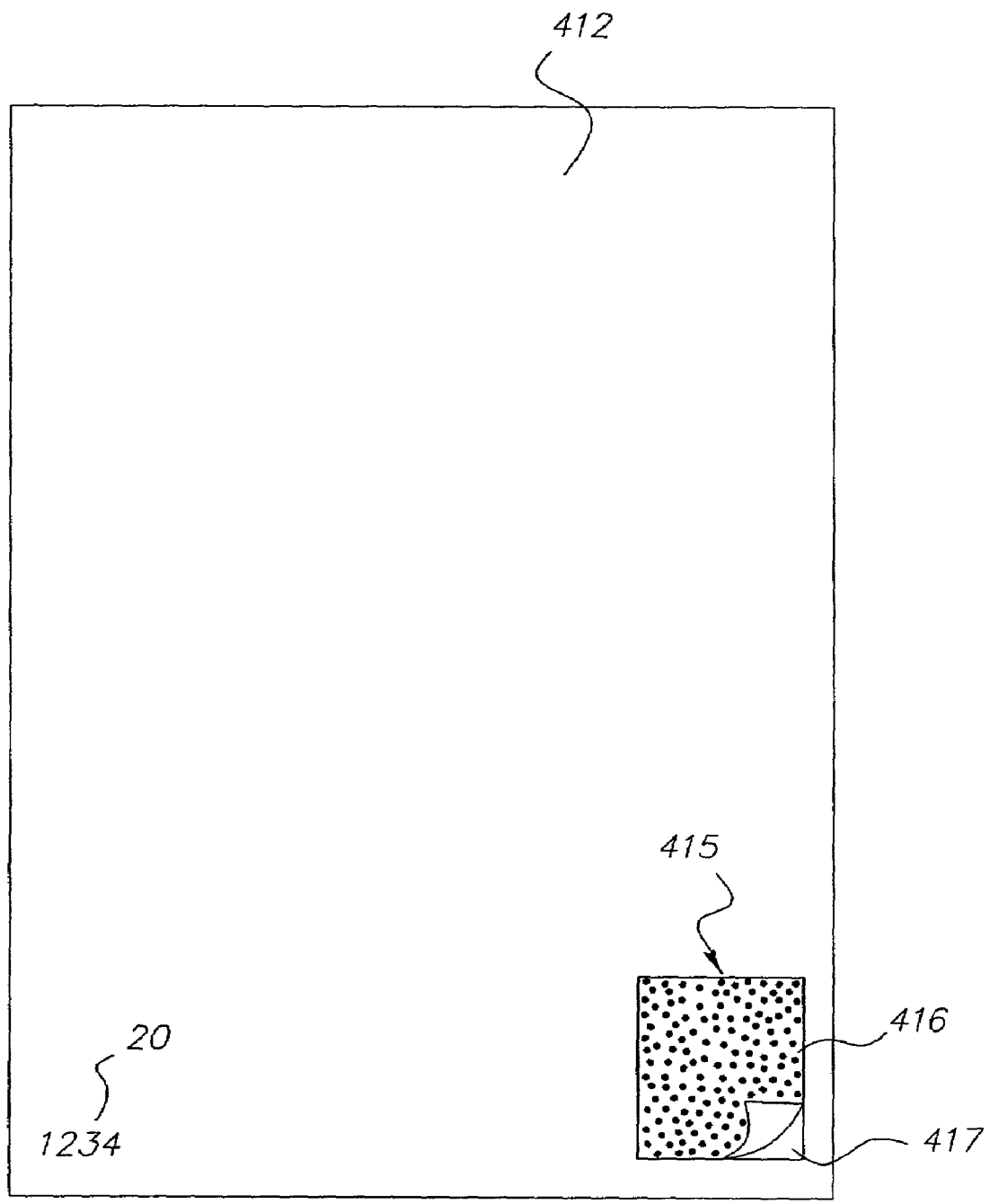
FIG. 10a is a schematic of a sheet of media having a place for forming a physical indicia identifier with a protective cover made in accordance with the present invention.
Figure 10B:
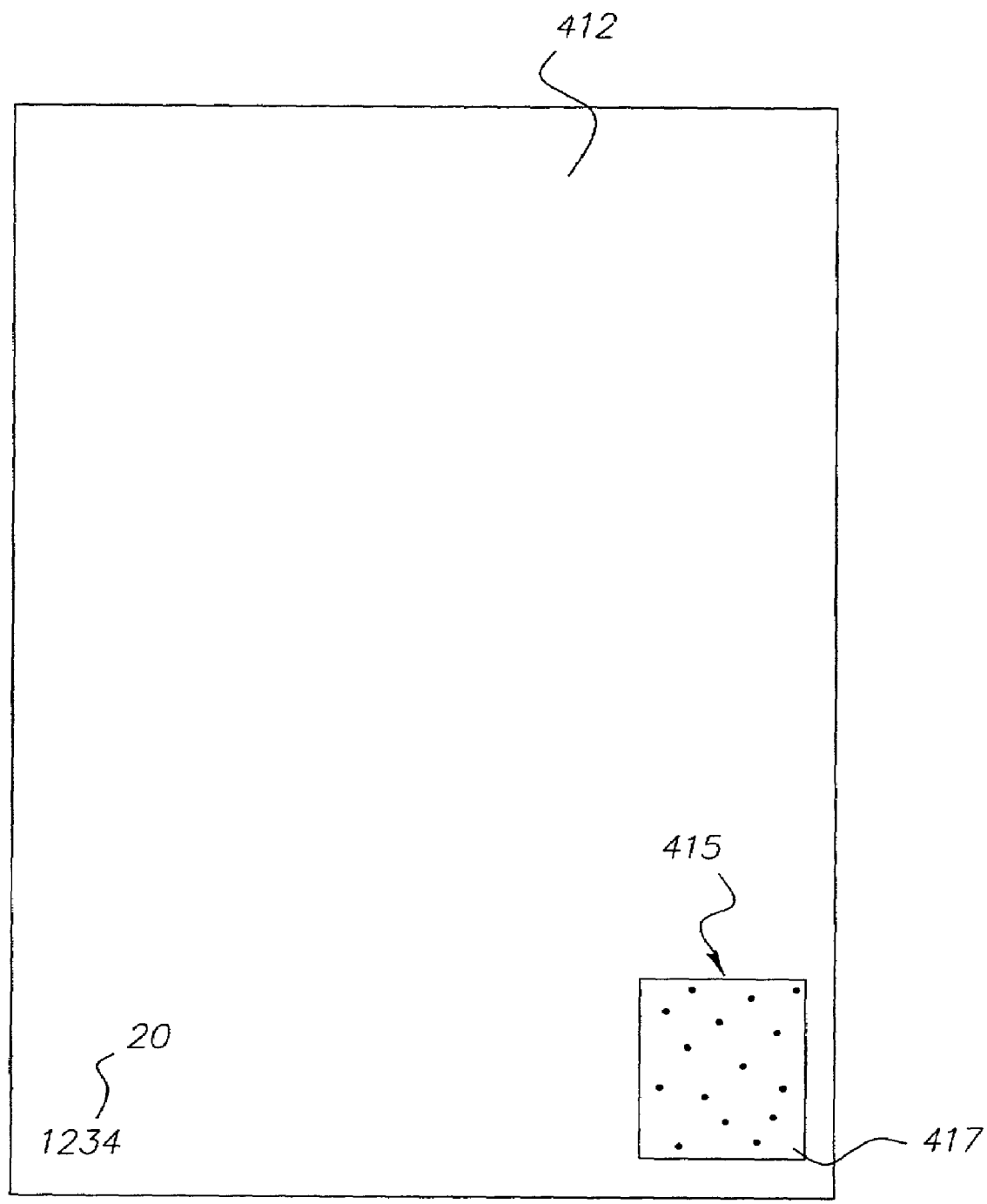
FIG. 10b is a view similar to FIG. 10a with the protective cover removed.
Figure 10C:
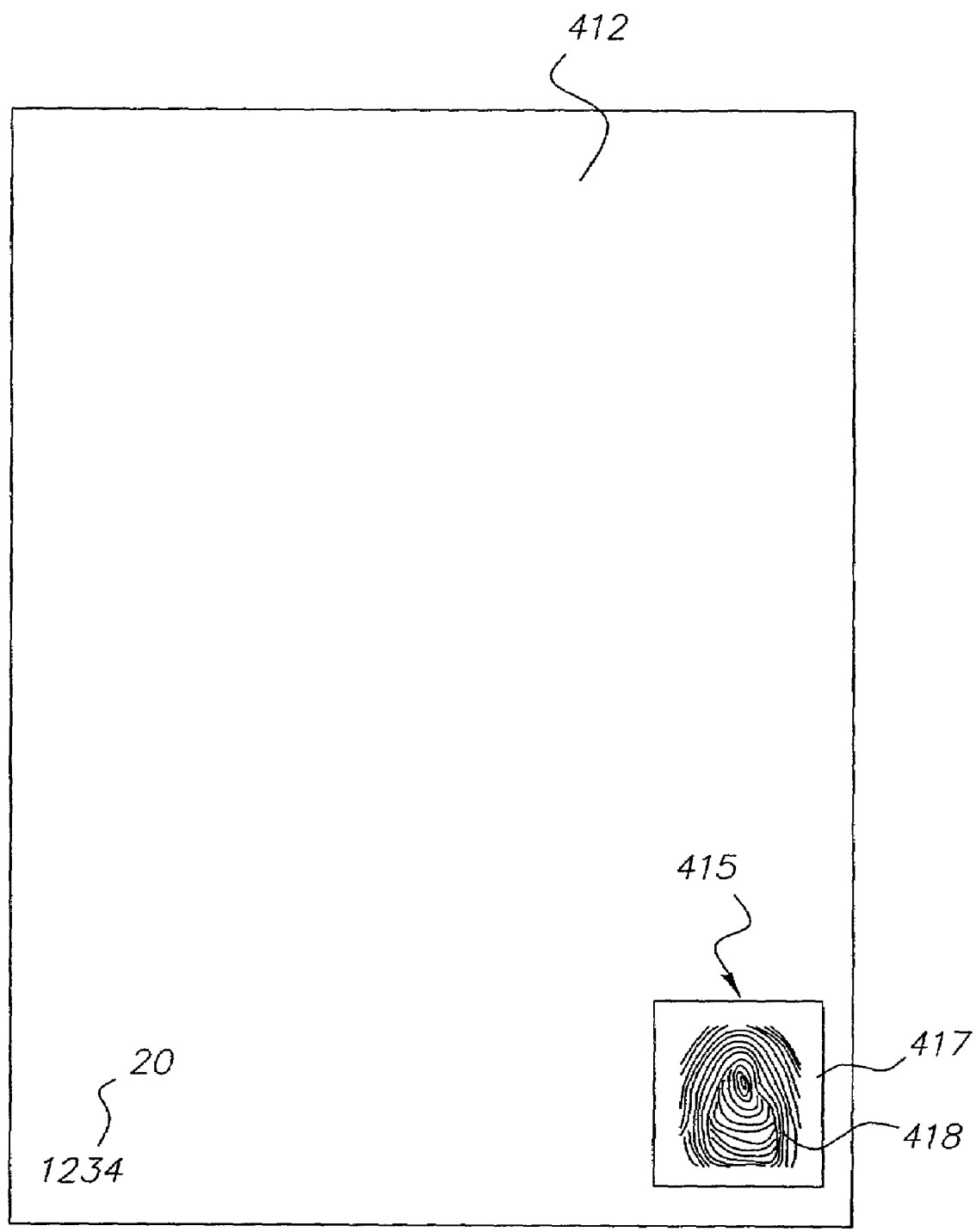
FIG. 10c is a schematic of a sheet of media of FIG. 10b having a physical indicia identifier made in accordance with the present invention.

Referring to FIGS. 10a, 10b, and 10c there is illustrated a sheet 412 for making a document in accordance with the present invention. Sheet 412 may be a print medium such as photosensitive media, ink-jet media, thermal transfer media or plain paper having of an area 415 on which a physical indicia identifier 418 (see FIG. 10c) can be formed thereon. A protective cover sheet 416 is placed over area 415. The area 415 has an indicia forming material 417 such as an organosilane material, which is capable of forming an impression of the physical indicia identifier 418 when it is pressed into its surface. Such an organosilane formulation useful for the practice of the invention is disclosed in U.S. Pat. No. 5,387,105 to Dougherty, et al. The material of the '105 patent is ordinarily useful for the formation of dental impressions but is also useful for forming a physical impression of a physical indicia identifier 418. Once an impression is made using the organosilane of the '105 patent the material is then cured by exposure to light (any wavelength in the range 360 to 600 nm). The protective cover sheet 416 is fabricated from a light-tight material (for example, a black plastic sheet filled with an appropriate level of carbon particles). After the cover sheet 416 is removed, an impression is made from the identifier 418, followed by exposure to light, which causes the physical impression to become permanent. As an alternative to curing by light, other formulations of organosilanes, for example the formulation disclosed in U.S. Pat. No. 4,228,065 to Genth, et al, may be cured by exposure to air. The organosilane formulation of the '065 patent contains a silicon cross-linking agent and an accelerant. In the case of the use of the latter formulation, cover sheet 416 is fabricated from a material which is an effective barrier to air such as a sheet of polyester plastic, thereby preventing the receiving material 417 from hardening until after it is removed. The formed physical indicia identifier 418 can be but is not limited to a fingerprint, notary seal, alpha-numeric symbol etc. that can be embossed or pressed into the receiving material 417 and may or may not be visible to the unaided eye. The receiving material 417 may be located on the front and/or back surface of the sheet 412 and not duplicatable using known visual copying techniques. In the example shown the protective cover 416 is peeled away from the receiving material 417, the user then forms the unique physical indicia identifier 418 by pressing a finger or thumb unto the material 417 forming a 3 dimensional replica of the user's fingerprint 418, which cures to a permanent state as described above.

Figure 11A:
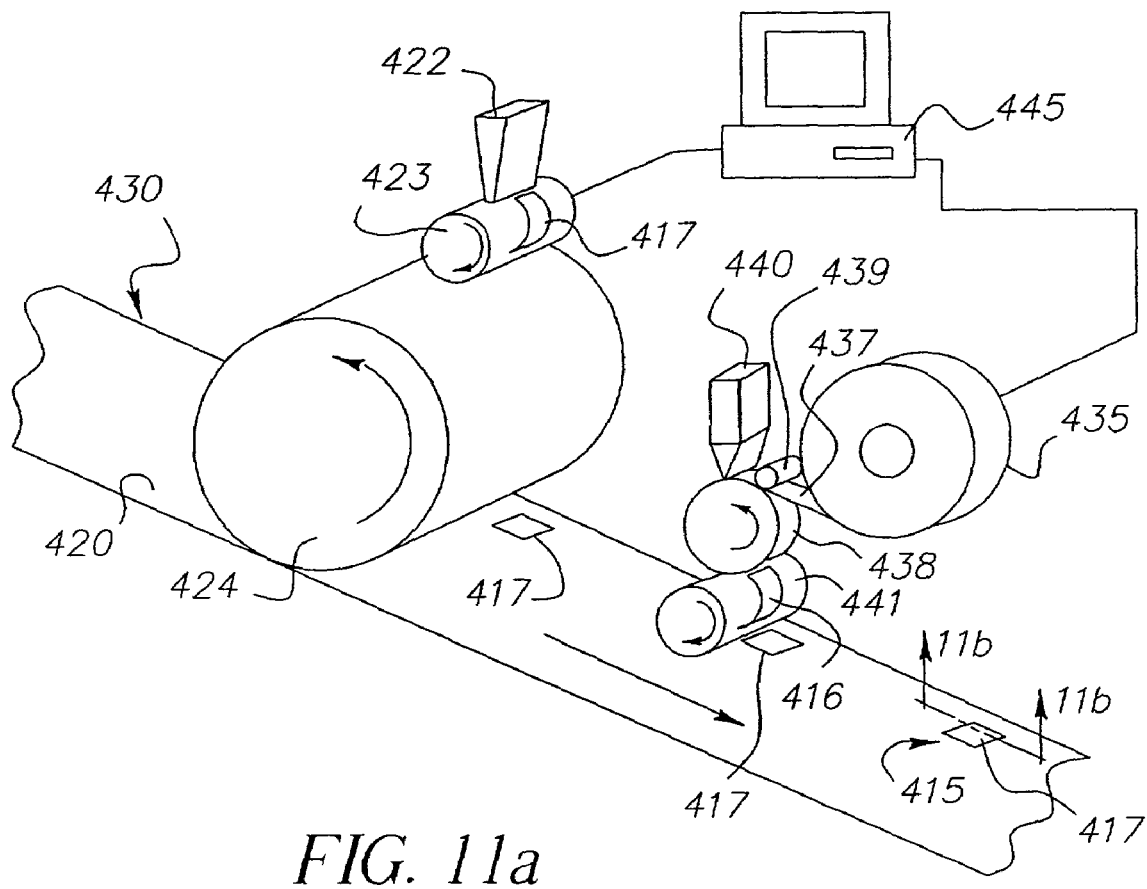
FIG. 11a is a schematic diagram of a system made in accordance with the present invention illustrating how a web of media of FIG. 10a may be made.

Referring now to FIG. 11a, there is illustrated a schematic diagram of an apparatus for applying the material 417 on area 415 for forming the physical indicia identifier to a web 420 of media 412. The method for manufacturing resin-coated media has previously been explained in FIG. 2. The type of media 412 being manufactured can determine whether the physical indicia identifier area 415 is located on the front or back surface. In the embodiment shown the indicia forming material 417 is applied to the receiving area 415 using a hopper 422, a coating wheel 423 and a transfer roller 424. The transfer roller 424 applies the indicia forming material 417 to a front surface 430 of the web 420 of the media 412. After coating the indicia forming material 417, the web passes under a device for applying the protective cover 416. The device consists of a roll 435 of protective cover material 437 such as PVDC or SARAN Wrap—Poly (Vinyl lidene), EVAL—Ethylene vinyl alcohol, and PET—Poly(ethylene terephthalate) with one side having a low tack adhesive. The protective cover material 437 is metered onto a vacuum roller 438 via a metering roller 439 and cut to length via a cutter 440. The protective cover 416 is then transferred from the vacuum roller 438 via a transfer roller 441 to the web 420 covering the receiving area 415 and material 417. A logic control unit, such as computer 445 controls the device for applying the indicia forming material 417 and the device for applying the protective cover 416.

Figure 11B:
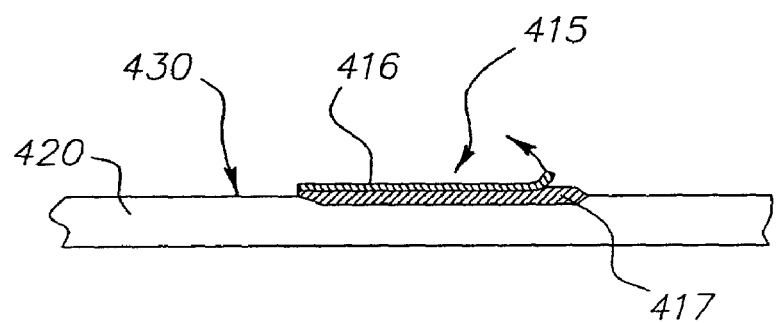
Figure 12A:
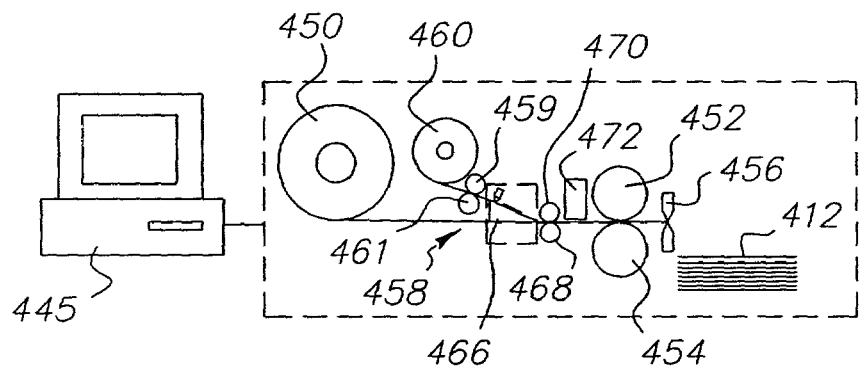
FIG. 12a is a schematic diagram illustrating how another embodiment of a sheet of media having a physical indicia identifier is made in accordance with the present invention.
Figure 12B:
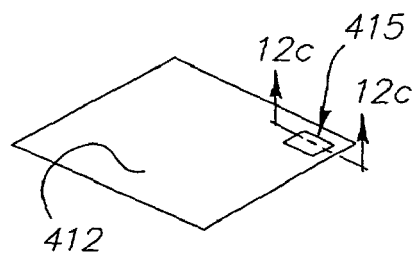
Figure 12C:
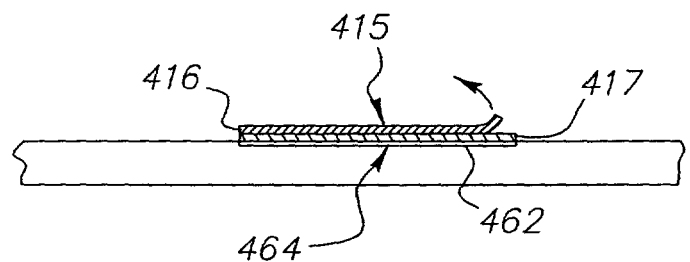
FIG. 12c is a section view of the media of FIG. 12b made in accordance with the present invention taken along line 12c—12c.

FIG. 11b illustrates a section view of the web 420 of media 412 of FIG. 11a made in accordance with the present invention. Like numerals in FIG. 11b indicate like parts and operation as previously discussed with respect to FIG. 11a. Referring now to FIGS. 12a, 12b and 12c, there is illustrated another embodiment of an apparatus for applying a material 417 on area 415 for forming the physical indicia identifier to a web 420 of media 412 made in accordance with the present invention wherein the web 420 is cut into a plurality of cut sheets 412 each having physical indicia identifier receiving area 415. Like numerals in FIG. 12a indicate like parts and operation as previously discussed with respect to FIG. 11a. The web 420 is fed from the roll 450 via a set of drive rollers 452 and 454 and passes under a tape-dispensing device 458, which applies tape 460 on area 415 for forming the physical indicia identifier to a web 420. The device 458 feeds a tape 460 comprised of protective cover 416 covering the receiving material 417, which has an adhesive 462 on the bottom side 464 (see FIG. 12c) via rollers 459 and 461. The tape 460 is cut to length via a cutter assembly 466. The tape 460 is pressed into place via rollers 468 and 470 and permanently adhered via the curing assembly 472. After the tape 460 has been placed on area 415 and adhered to the web 420, web 420 is cut into sheets of media 412 via a cutter assembly 456. Each sheet 412 having its' own distinct physical indicia material 417 on area 415. Each sheet 412 can also be printed with a unique identification number 20 as described previously in FIG. 4. The logic control unit 445 controls the operation of placing the tape 460 and cutting the web 460 into sheets.

Referring to FIG. 12b, there is illustrated a top view of the sheet media 412 shown in FIG. 12a made in accordance with the present invention. Like numerals in FIG. 12b indicate like parts and operation as previously discussed with respect to FIG. 12a.

FIG. 12c illustrates a section view of the web 420 of media 412 of FIG. 12b made in accordance with the present invention taken along line 12c—12c. Like numerals in FIG. 12c indicate like parts and operation as previously discussed with respect to FIG. 12a.

Figure 13:
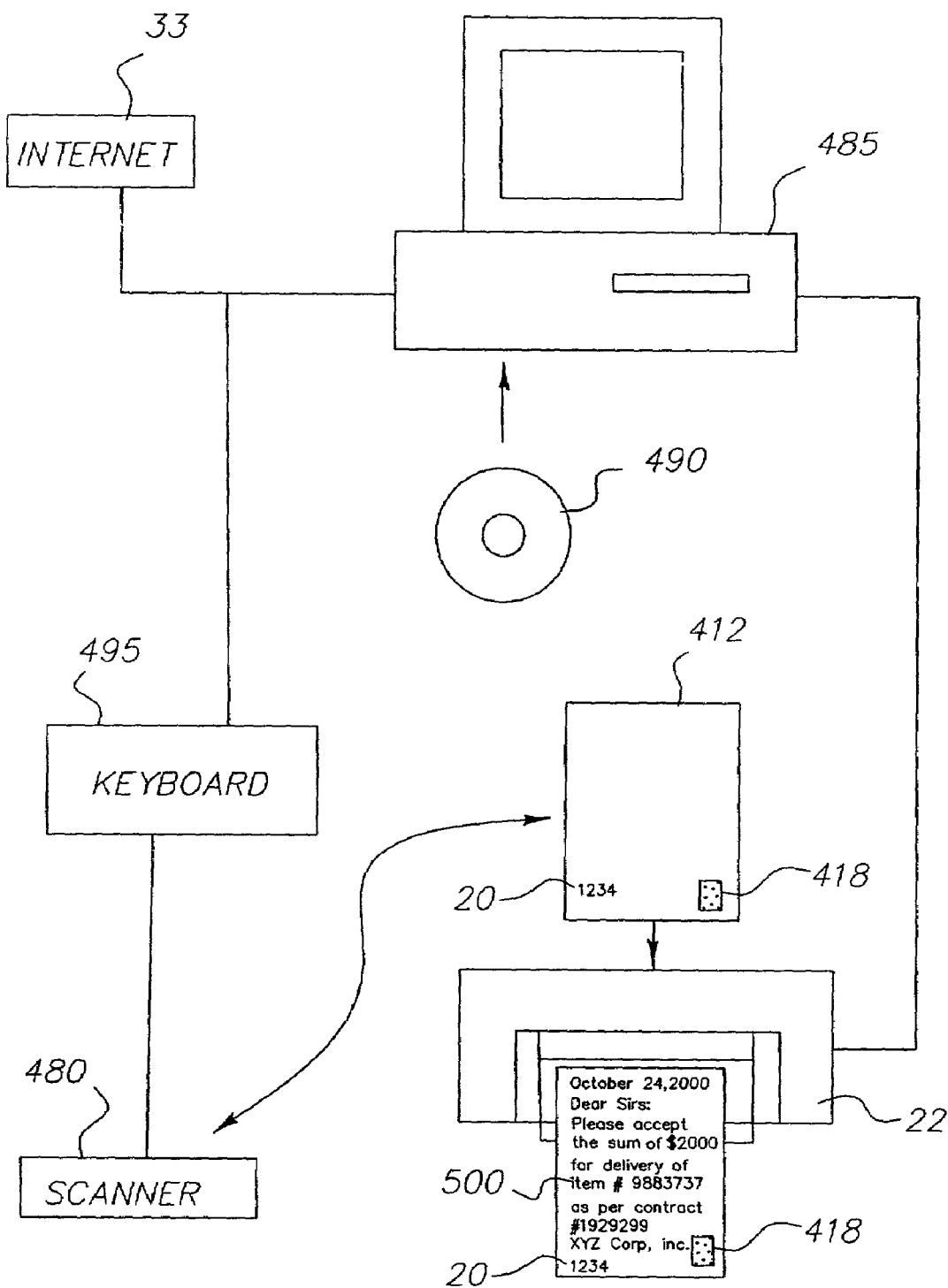
FIG. 13 is a schematic diagram of a system made in accordance with the present invention.

Referring now to FIG. 13, the media sheet 412 containing the physical indicia identifier 418, which has previously been formed by the user, is placed into a scanner 480 and a high-resolution scan of the physical indicia identifier 418 is made. The high resolution-scan is on the order of 1200 dots/inch. The results of the high resolution-scan are stored in memory, for example in the memory of computer 485 or written on a memory storage device such as on a CD-R 490, floppy disk, DVD, hard drive, portal hard drive, etc. via the computer 485 along with the identification number 20. The identification number 20 can be the previously number printed on the sheet 412, can be generated by a software program in the computer 485 or can be created by the user and entered into the computer 485 via a keyboard 495. The high-resolution scan of the physical indicia identifier 418 can also be stored on a remote server located at a service provider and be accessed via a communication network such as the Internet 33. The media sheet 412 containing the physical indicia identifier 418 is then placed into a printer 22 such as an inkjet or thermal printer. Using a word processor such as Microsoft Word or Claris Works, the user creates the text file, which is to be printed on a finished document 500 along with the identification number 20. The method for producing the document is previously described in FIG. 5.

The invention has been described in detail with particular reference to certain preferred embodiments thereof, but it will be understood that variations and modifications can be effected within the spirit and scope of the invention.

PARTS LIST 10 sheet
15 physical indicia identifier
20 identification number 22 printer
25 CD
30 computer
32 keyboard
33 Internet
34 document
36 text
40 base
41 media
42 hopper
43 cut sheets
44 chilled roller
45 computer
46 roll
47 roll
48 indicia identifier forming rollers
49 indicia identifier forming rollers
50 heating elements
52 scanner
54 scanner
55 drive roller
56 printer
57 drive roller
58 printer
60 cutter assembly
100 step
110 step
120 step
130 step
140 step
150 step
160 step
165 digital text file
170 step
175 distilled digital text file
180 step
185 message image
190 step
195 dispersed message
200 step
220 step
230 step
240 step
250 step
260 step
270 step
280 step
285 step
290 step
295 step
296 decision block
297 step
298 step
300 step
310 step
320 step
330 step
340 step
350 step
360 step
370 decision block
380 step
390 step
405 digital text file
410 candidate message image
412 media sheet
415 physical indicia identifier area
416 protective cover sheet
417 receiving material
418 unique physical indicia identifier
420 web
422 hopper
423 wheel
424 transfer roller
430 front surface
435 roll
437 protective cover material
438 vacuum roller
439 metering roller
440 cutter
441 transfer roller
445 computer
450 roll
452 drive roller
454 drive roller
456 cutter assembly
458 tape dispensing device
459 roller
460 tape
461 roller
462 adhesive
464 bottom side
466 cutter assembly
468 roller
470 roller
472 curing assembly
480 scanner
485 computer
490 CD-R
495 keyboard
500 finished document

What is claimed is:

1. A method for making an authenticable original document on a sheet of media, said sheet of media having a material thereon on which a physical indicia identifier can be formed by the user and an identification number printed thereon, comprising the steps of:
   obtaining a high resolution scan of said physical indicia identifier and creating a digital file of said high resolution scan;
   associating the high resolution scan file to the identification number printed on said sheet of media;
   storing the high resolution scan file in memory;
   creating a digital text file to be printed on said sheet;
   distilling said digital text file;
   creating a message image using the distilled text file;
   combining the message image with the high-resolution scan file of physical indicia identifier so as to create a dispersed message; and
   printing said dispersed message along with the text file on said sheet.

2. The method according to claim 1 wherein said memory device comprises as a CD.

3. The method according to claim 1 wherein said memory device comprises an electronic E-mail address.

4. The method according to claim 1 wherein said combining is convolving.

* * * * *